(12) United States Patent
Vedantham et al.

(10) Patent No.: US 8,784,519 B2
(45) Date of Patent: Jul. 22, 2014

(54) VITRIOUS BONDED ABBRASIVE

(75) Inventors: Ramanujam Vedantham, Worcester, MA (US); Rachana Upadhyay, Shrewsbury, MA (US); Gilles Querel, Woluwe Saint-lambert (BE)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 0 days.

(21) Appl. No.: 13/504,915

(22) PCT Filed: Oct. 27, 2010

(86) PCT No.: PCT/US2010/054347
§ 371 (c)(1),
(2), (4) Date: Jul. 13, 2012

(87) PCT Pub. No.: WO2011/056680
PCT Pub. Date: May 12, 2011

(65) Prior Publication Data
US 2012/0266543 A1    Oct. 25, 2012

Related U.S. Application Data

(60) Provisional application No. 61/255,254, filed on Oct. 27, 2009.

(51) Int. Cl.
B24D 3/32 (2006.01)
B24D 3/18 (2006.01)
B24D 18/0009 (2006.01)

(52) U.S. Cl.
USPC .............................................. 51/296; 51/309

(58) Field of Classification Search
USPC ............................... 51/296, 295, 309; 501/13
See application file for complete search history.

(56) References Cited

U.S. PATENT DOCUMENTS 3,422,032 A    1/1969   Figiel et al.
4,944,773 A    7/1990   Rue et al.
(Continued)

FOREIGN PATENT DOCUMENTS

EP    0211247 A2    2/1987
EP    0620083 A1    10/1994
(Continued)

OTHER PUBLICATIONS

International Search Report from PCT/US2010/054347 mailed Jul. 26, 2011.

(Continued)

*Primary Examiner* — Pegah Parvini
(74) *Attorney, Agent, or Firm* — Joseph P. Sullivan; Abel Law Group, LLP

(57) ABSTRACT

A vitrified superabrasive product includes a superabrasive component and a vitrified bond component in which the superabrasive component is dispersed. The vitrified bond includes an oxide of a lanthanoid. Additionally, the vitrified bond component defines pores that can be essentially all less than 800 μm in diameter. Seventy percent of the pores are in a range of between about 40 μm and about 500 μm and have an average aspect ratio less than about 2. The porosity is in a range of between about 50% and about 90% of the total volume of the superabrasive product.

18 Claims, 3 Drawing Sheets

(56) References Cited

U.S. PATENT DOCUMENTS

| | | |
|---|---|---|
| 4,951,427 A | 8/1990 | St. Pierre |
| 5,129,919 A | 7/1992 | Kalinowski et al. |
| 5,152,810 A | 10/1992 | Rue et al. |
| 5,212,120 A * | 5/1993 | Araujo et al. ............ 501/13 |
| 5,436,063 A | 7/1995 | Follett et al. |
| 5,582,672 A | 12/1996 | Follett et al. |
| 5,738,696 A | 4/1998 | Wu et al. |
| 5,738,697 A | 4/1998 | Wu et al. |
| 5,776,290 A | 7/1998 | Follett et al. |
| 5,834,109 A | 11/1998 | Follett et al. |
| 5,834,569 A | 11/1998 | Ramanath et al. |
| 5,863,308 A * | 1/1999 | Qi et al. .................. 51/309 |
| 5,891,206 A | 4/1999 | Ellingson |
| 6,056,794 A | 5/2000 | Stoetzel et al. |
| 6,074,278 A | 6/2000 | Wu et al. |
| 6,102,789 A | 8/2000 | Ramanath et al. |
| 6,258,136 B1 | 7/2001 | Kinisky et al. |
| 6,348,240 B1 | 2/2002 | Calvert et al. |
| 6,394,888 B1 | 5/2002 | Matsumoto et al. |
| 6,527,854 B1 | 3/2003 | Prelas et al. |
| 6,702,867 B2 | 3/2004 | Carman et al. |
| 6,709,747 B1 | 3/2004 | Gordeev et al. |
| 6,755,729 B2 | 6/2004 | Buljan et al. |
| 6,770,107 B2 | 8/2004 | Teutsch et al. |
| 6,913,517 B2 | 7/2005 | Prasad |
| 7,008,672 B2 | 3/2006 | Gordeev et al. |
| 7,294,158 B2 | 11/2007 | Welygan et al. |
| 8,216,325 B2 | 7/2012 | Upadhyay |
| 8,216,326 B2 | 7/2012 | Upadhyay et al. |
| 2002/0090891 A1 | 7/2002 | Adefris et al. |
| 2002/0173259 A1 | 11/2002 | Drury |
| 2003/0194947 A1 | 10/2003 | Bright et al. |
| 2003/0194954 A1 | 10/2003 | Bonner et al. |
| 2003/0205003 A1 | 11/2003 | Carman et al. |
| 2003/0232586 A1 | 12/2003 | Ramanath et al. |
| 2004/0137834 A1 | 7/2004 | Webb et al. |
| 2004/0166790 A1 | 8/2004 | Balijepalli et al. |
| 2004/0185763 A1 | 9/2004 | Ishizaki et al. |
| 2004/0247873 A1 | 12/2004 | Gordeev et al. |
| 2006/0010780 A1 | 1/2006 | Hall et al. |
| 2006/0135045 A1 | 6/2006 | Bian et al. |
| 2006/0137256 A1 * | 6/2006 | Yui et al. .................. 51/295 |
| 2006/0211342 A1 | 9/2006 | Bonner et al. |
| 2007/0028525 A1 | 2/2007 | Woo et al. |
| 2007/0060023 A1 | 3/2007 | Jeong |
| 2007/0099548 A1 | 5/2007 | Kumar et al. |
| 2007/0261690 A1 | 11/2007 | Jentgens |
| 2008/0066387 A1 | 3/2008 | Bonner et al. |
| 2008/0085660 A1 | 4/2008 | Orlhac |
| 2008/0222967 A1 | 9/2008 | Querel et al. |
| 2009/0093198 A1 * | 4/2009 | Subramanian et al. ....... 451/246 |
| 2009/0218276 A1 | 9/2009 | Linford et al. |
| 2009/0313906 A1 * | 12/2009 | Upadhyay et al. .............. 51/296 |
| 2011/0143641 A1 | 6/2011 | Ramanath et al. |

FOREIGN PATENT DOCUMENTS

| | | |
|---|---|---|
| EP | 0963813 A1 | 12/1999 |
| EP | 1598147 A2 | 11/2005 |
| EP | 1598147 B1 | 3/2008 |
| JP | H3-281174 A | 12/1991 |
| JP | 1996-057768 A | 3/1996 |
| JP | 08-253352 A | 10/1996 |
| JP | 1996-257920 A | 10/1996 |
| JP | H08-257920 A | 10/1996 |
| JP | 1999-188647 A | 7/1999 |
| JP | 2000-190232 A | 7/2000 |
| JP | 2000-343438 A | 12/2000 |
| JP | 2003-136410 A | 5/2003 |
| JP | 2004-034173 A | 2/2004 |
| JP | 2005-319556 A | 11/2005 |
| JP | 2006-001007 A | 1/2006 |
| JP | 2006-334778 A | 12/2006 |
| JP | 2007-196345 A | 8/2007 |
| JP | 2007-290101 A | 11/2007 |
| JP | 2009-061554 A | 3/2009 |
| JP | 2010-521326 A | 6/2010 |
| WO | 95-19871 A1 | 7/1995 |
| WO | 98/04385 A1 | 2/1998 |
| WO | 00/73023 A1 | 12/2000 |
| WO | 03/099518 A1 | 12/2003 |
| WO | 2004/011196 A1 | 2/2004 |
| WO | 2008117883 A1 | 10/2008 |
| WO | 2009/128982 A2 | 10/2009 |
| WO | 2010/008430 A1 | 1/2010 |
| WO | 2011/056680 A2 | 5/2011 |

OTHER PUBLICATIONS

International Search Report from PCT/US2009/002821 mailed Dec. 30, 2009.

International Search Report for PCT/US2009/002839 mailed Feb. 1, 2010.

International Search Report for PCT/US2010/054347 mailed Jul. 26, 2011.

Zhou, Libo et al., "A Novel Fixed Abrasive Process: Chemo-Mechanical Grinding Technology," Int. J. Manufacturing Technology and Management, vol. 7, Nos. 5/6, 2005, Copyright 2005 Inderscience Enterprises Ltd., pp. 441-454.

Technical Search Results, 12 pages, 2009, September.

International Search Report for PCT/US2010/054329 mailed Jul. 27, 2011.

International Search Report for PCT/US2012/072240 mailed Apr. 25, 2013, 2 pages.

* cited by examiner

VITRIOUS BONDED ABBRASIVE

CROSS-REFERENCE TO RELATED APPLICATION

The present application claims priority from PCT Application No. PCT/US2010/054347, filed Oct. 27, 2010, entitled "VITREOUS BONDED ABRASIVE" naming inventors Ramanujam VEDANTHAM, Rachana UPADHYAY, and Gilles QUEREL which in turn claims priority to U.S. Provisional Patent Application Ser. No. 61/255,254 filed on Oct. 27, 2009, entitled "VITREOUS BONDED ABRASIVE" naming inventors Ramanujam VEDANTHAM, Rachana UPADHYAY, and Gilles QUEREL, which are all incorporated by reference herein in their entirety.

TECHNICAL FIELD

The present disclosure relates generally to vitreous bonded abrasive.

BACKGROUND ART

Since this world is moving towards thinner and smaller devices, the requirements for thinner wafers (less than 50 microns) is growing. To achieve higher strength of ground silicon wafers, use of smaller grains will be required. During grinding, a decrease in the size of the grain in the composite microstructure will decrease the force required to reduce the effective chip thickness coming out of the wafer. As a result of reduced chip thickness, the strength of the final ground silicon wafers will increase. In addition, new developments in wafer manufacturing technology are moving toward wafers of larger size, thereby causing increasing difficulty in maintaining flatness of a wafer during the grinding process.

Many conventional abrasive tools employed in roughing and finishing these materials include metal-bonded superabrasive. Metal-bonded abrasive tools generally grind fewer parts per hour than glass-bonded tools. Further, metal-bonded abrasive tools can contaminate surfaces of components to be incorporated into electronic devices, thereby severely limiting their use for grinding applications or slicing silicon wafers.

Typically, vitrified bonded tools offer a higher stiffness and low degradation, thereby resulting in better tolerances, flatness in product and an increase number of parts that can be produced per wheel. Although vitrified bonded grinding tools could be employed having a lower grit size, they typically do not have sufficient self-dressing ability due to low porosity or pore structure.

Resin bonds often exhibit higher wear and have a self-dressing ability. Typically, the relatively low stiffness of resin bonds produces lower surface roughness or a better finish than grinding tools that employ a vitrified bond and grains of similar grit size. However, resin bonds typically can not be used where grit size is lower than 2 microns because the grains are pushed inside of the compliant resin bond during grinding, thereby requiring higher applied pressure and, consequently, causing elevated temperature at the grinding surface. As a result, when particularly applied to larger wafers, maintaining an acceptable flatness of the wafer during grinding becomes more difficult.

The industry continues to demand improved grinding wheels capable of providing finishes commensurate with demands for thinner wafers.

DISCLOSURE OF INVENTION

In an embodiment, a vitrified superabrasive product can include a superabrasive component, and a vitrified bond component in which the superabrasive component is dispersed. The vitrified bond can include an oxide of a lanthanoid. Additionally, the vitrified bond component can defines pores that can be essentially all less than 800 μm in diameter. Seventy percent of the pores can be in a range of between about 40 μm and about 500 μm and have an average aspect ratio less than about 2. The porosity can be in a range of between about 50% and about 90% of the total volume of the superabrasive product.

In a particular embodiment, the lanthanoid can include an element having an atomic number not less than 57 and not greater than 60, such as lanthanum, cerium, praseodymium, and neodymium. More particularly, the lanthanoid can include cerium, and even can consist essentially of cerium. The oxide of the lanthanoid can be present in an amount in a range of between about 0.1 and about 10 volume percent of the vitrified superabrasive product.

In another embodiment, a vitrified superabrasive product can include a vitrified bond component and a superabrasive component dispersed in the vitrified bond component. The vitrified bond component can include silica and an oxide of a lanthanoid, and can have a porosity of at least about 50 percent of the total volume of the vitrified diamond abrasive. The superabrasive component can consist essentially of particles having a median particle size in a range of between about 0.1 microns and about 60 microns. The volume ratio of superabrasive component to the vitrified bond component can be in a range of between about 3:2 and about 1:99.

In a further embodiment, a grinding tool can include a base and a vitrified superabrasive component at a surface of the base. The vitrified superabrasive component can include a superabrasive component and a vitrified bond component in which the superabrasive component is dispersed. The vitrified bond component can include an oxide of a lanthanoid, and the vitrified bond component can define pores occupying greater than about fifty percent of the total volume of the vitrified superabrasive component.

In yet another embodiment, a superabrasive mixture can include glass powder, superabrasive grit, binder, silicon carbide, and an oxide of a lanthanoid. The glass powder can include at least one member selected from the group consisting of silicon dioxide ($SiO_2$), boron oxide ($B_2O_3$), aluminum oxide ($Al_2O_3$), alkali oxides ($Li_2O$, $Na_2O$, $K_2O$), and alkaline earth oxides (CaO, MgO, BaO). The superabrasive grit can include a diamond particulate having a median particle size in a range of between about 0.1 microns and about 60 microns. The volume ratio of the abrasive to glass particles can be in a range of between about 3:2 and about 1:99. The binder can include at least one member selected from the group consisting of polyethylene glycol, water, a mixture of polyethylene glycol and water, and colloidal silica. The silicon carbide can be present in the form of particles having a median particle size in a range of between about 0.1 microns and about 20 microns, and can be present in the mixture in an amount in a range of between about 0.1 and about 5 volume percent of the total amount of glass powder, abrasive grit, binder silicon carbide, and rare-earth oxide components of the mixture. The oxide of a lanthanoid can be present in the form of particles having a median or average particle size in a range of between 0.1 microns and about 30, or between 0.1 microns and about 10 microns, and in an amount in a range of between about 0.1 and about 5 volume percent of the total amount of glass powder, abrasive grit, binder, silicon carbide, and oxide components of the mixture.

In yet another embodiment, a method of forming a vitrified superabrasive product can include forming a green body, and firing the green body under an atmosphere and pressure, and at a temperature, sufficient to form a porous vitrified superabrasive product. The green body can include glass powder, superabrasive grit, binder, silicon carbide, and an oxide of a lanthanoid.

In an embodiment, a vitrified superabrasive product can include a superabrasive component, and a vitrified bond component in which the superabrasive component is dispersed. The vitrified bond component can define pores that are essentially all less than 800 μm in diameter. Seventy percent of the pores can be in a range of between about 40 μm and about 500 μm, and have an average aspect ratio less than about 2. The vitrified superabrasive product can have a Surface Roughness Index of not greater than about 35 Angstroms. In a particular embodiment, the Surface Roughness Index can be not greater than about 33 Angstroms, such as not greater than about 31 Angstroms. The Surface Roughness Index is a standardized measurement of the performance of the vitrified superabrasive product when back grinding silicon wafers. Specifically, the Surface Roughness Index measures the average surface roughness (Ra) of a set of silicon test wafers ground under the specified test conditions described in more detail below.

In another exemplary embodiment, a method of back grinding a wafer can include providing a wafer; and back grinding the wafer to an average surface roughness (Ra) of not greater than 35 Angstroms using a vitrified superabrasive product. In a particular embodiment, the average surface roughness can be not greater than about 33 Angstroms, such as not greater than about 31 Angstroms. The vitrified superabrasive product can including a superabrasive component, and a vitrified bond component in which the superabrasive component is dispersed. The vitrified bond component can define pores that are essentially all less than 800 μm in diameter. Seventy percent of the pores can be in a range of between about 40 μm and about 500 μm, and have an average aspect ratio less than about 2. The porosity can be in a range of between about 50% and about 90% of the total volume of the superabrasive product.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
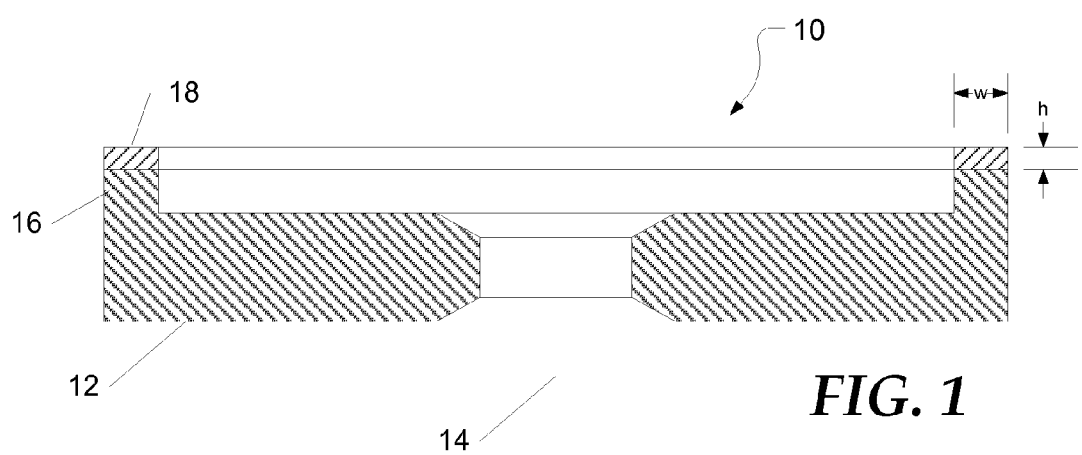
FIG. 1 is a cross-section of an embodiment of a tool that employs a vitrified superabrasive product.

In an embodiment, a vitrified superabrasive product includes a superabrasive component, and a vitrified bond component in which the superabrasive component is dispersed. The superabrasive component can be an abrasive having a hardness, as measured on the Knoop Hardness Scale of at least that of cubic boron nitride (CBN), i.e., a $K_{100}$ of at least 4,700. In one embodiment, the vitrified superabrasive product includes a superabrasive component that includes at least one member selected from the group consisting of diamond, cubic boron nitride, zirconia, and aluminum oxide. Suitable superabrasive materials can be crystalline or polycrystalline. In particular embodiments, the superabrasive material can include diamond, and can even consist essentially of diamond.

The superabrasive material is in the form of grain, also known as "grit." The superabrasive grain component can be obtained commercially or can be custom-produced. Generally, the superabrasive employed has a number average particle size in a range of between about 0.1 micrometers (microns, μm) and about 60 μm, such as in a range of between about 0.1 μm and about 2 μm.

In an embodiment, the superabrasive grain component is present in an amount of between about 0.1% and about 20% by volume of the superabrasive tool. In another embodiment, the superabrasive grain component is present in an amount of at least about 1% by volume of the superabrasive tool, even between about 2% and about 10% by volume of the superabrasive tool.

In a particular embodiment, the volume ratio of superabrasive grain to vitrified bond component of the vitrified superabrasive is in a range of between about 3:2 and about 1:99. In one particular embodiment, the superabrasive component of the vitrified superabrasive product can include diamond.

In an embodiment, the vitrified bond component is a suitable vitrified bond component, such as is known in the art. Examples of suitable vitrified bond components include at least one member selected from a group consisting of silicon dioxide ($SiO_2$), boron oxide ($B_2O_3$), aluminum oxide ($Al_2O_3$), alkali oxides ($Li_2O$, $Na_2O$, $K_2O$) and alkaline earth oxides (CaO, MgO, BaO).

In an embodiment, the vitrified bond includes an oxide of a lanthanoid. The oxide of the lanthanoid can be a compound or complex formed of a lanthanoid element and oxygen. The lanthanoid can include an element of the periodic table having an atomic number of not less than 57 and not greater than 60, such as lanthanum, cerium, praseodymium, and neodymium. Preferably, the lanthanoid can include cerium and even consist essentially of cerium. The oxide of the lanthanoid can be in an amount in a range of between about 0.1 and about 10 volume percent of the vitrified superabrasive product, such as between about 1.0 and about 4 volume percent.

In an embodiment, the vitrified superabrasive product can include pores within the vitrified bond material. The pores can be sized such that essentially all of the pores are less than 800 μm, such as less than 700 μm, such as less than 600 μm, even less than 500 μm. Further, about 70% of the pores will have diameters in a range of between about 40 μm and about 500 μm, or between about 60 μm and about 300 μm. In further embodiments, the average aspect ratio of the pores is not greater than about 2, such as not greater than about 1.5, such as not greater than about 1.3, even not greater than about 1.2. As used herein, the average aspect ratio is the average ratio of the longest dimension to the shortest dimension as measured from a magnified image for a group of at least 10 large pores. In another embodiment, the total porosity of the vitrified superabrasive product can be between about 50% and about 90%, such as between about 55% and about 85%, such as between about 60% and about 80%, even between about 65% and about 75%.

Further, the majority of the pores can comprise large pores having an average pore size of at least about 100 μm, such as at least about 125 μm, even at least about 150 μm. The large pores can have an average pore size of between about 100 μm to about 800 μm, such as between about 100 μm to about 600 μm, even between about 100 μm to about 500 μm.

Figure 3:
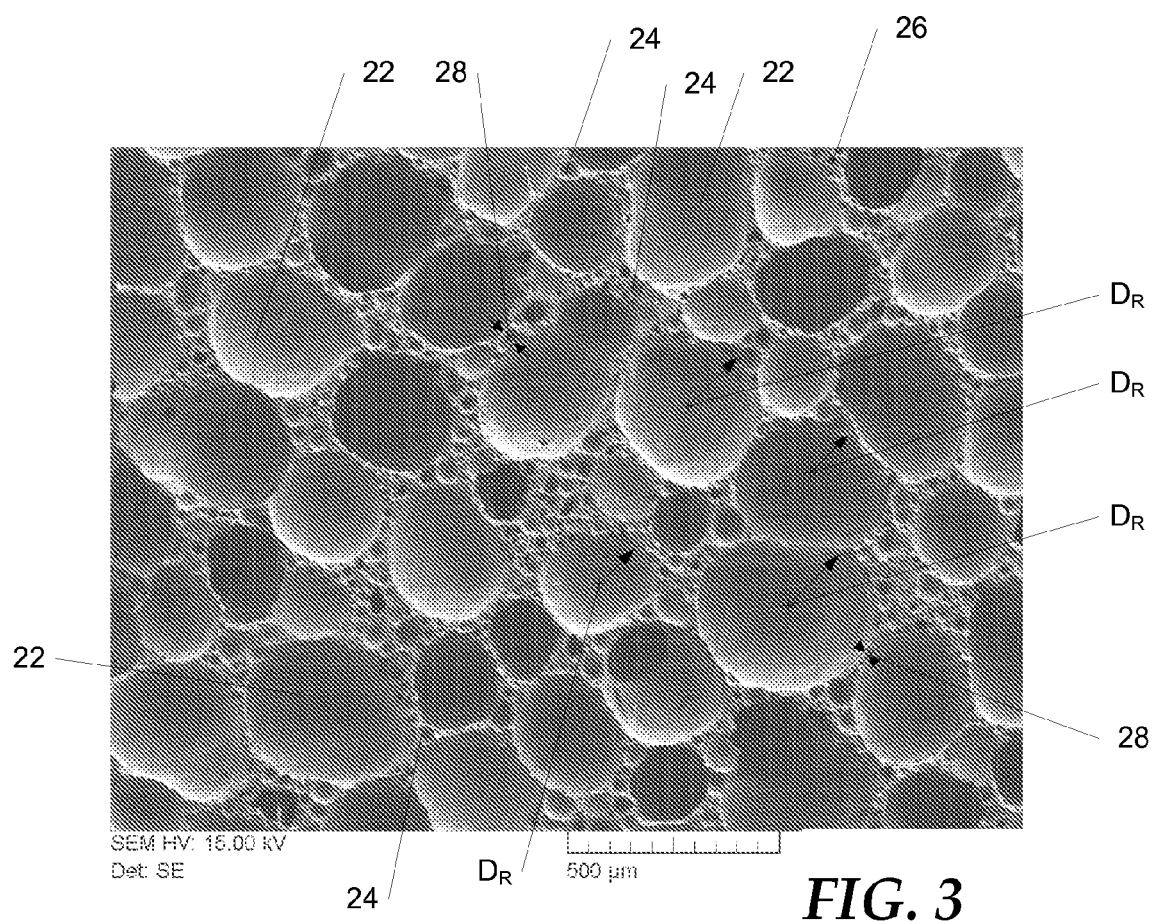

The vitrified superabrasive product can have a large pore spacing distance between immediately adjacent large pores of not greater than the radial distance ($D_R$), such as not greater than about $0.5(D_R)$, such as not greater than about $0.25(D_R)$, even not greater than about $0.1(D_R)$. The $D_R$ can be defined as the average radius of the large pores. In a particular embodiment, the majority of the large pores, such as at least about 75%, can be abutting each other. FIG. 3 provides an illustration of the radial distance ($D_R$) and the large pore spacing distance 28 between large pores 22 in an exemplary embodiment. As illustrated in FIG. 3, the large pores 22 can have an average radius ($D_R$) defining the radial distance as measured from a suitable sampling of large pores 22, such as at least 10 large pores 22 or more as viewed in a cross-sectional magnified image.

In an embodiment, the vitrified superabrasive product can include bond bridges 26 comprising vitrified bond component that can extend between the large pores 22. The bond bridges can include small pores 24 having an aspect ratio of less than about 2. Additionally, the small pores 24 can have an average width of less than about 100 µm, such as between about 1 µm and about 100 µm.

The bond bridges 26 can have a small pore spacing distance between immediately adjacent small pores of not greater than the small pore radial distance ($D_{Rs}$), such as not greater than about $0.5(D_{Rs})$, such as not greater than about $0.25(D_{Rs})$, even not greater than about $0.1(D_{Rs})$. The $D_{Rs}$ can be defined as the average radius of the small pores 24. In a particular embodiment, the majority of the small pores 24, such as at least about 75%, can be abutting each other. The small pore spacing distance and the small pore radial distance of the small pores 24 can be measured in the same way as described above with reference to the large pores.

Turning to the method of forming the vitrified superabrasive product, a superabrasive mixture can be formed. In one embodiment, the superabrasive mixture is a green body precursor to a vitrified superabrasive product. The superabrasive mixture can include a glass powder, a superabrasive grit, a binder, a oxide component, and silicon carbide. The superabrasive can have a median particle size in a range of between about 0.1 microns and about 60 microns. Generally, the volume ratio of superabrasive grit to glass powder is in a range of between about 3:2 and about 1:99. In a particular embodiment, the superabrasive grit may be in an amount of between about 0.1% and about 20% by volume of the superabrasive mixture. Examples of suitable glass powder include silicon dioxide ($SiO_2$), boron oxide ($B_2O_3$), aluminum oxide ($Al_2O_3$) and potassium oxide ($K_2O$). Preferred glass powder, or "frits," are those that have relatively low glass transition such as in a range of between about 450° C. and about 800° C. suitable for forming a final bond with a glassy or vitreous phase.

The binder can include at least one member selected from a group consisting of polyethylene glycol, water, a mixture of polyethylene glycol and water, and colloidal silica. In an embodiment, the binder can be in an amount of between about 10 wt % and about 20 wt % of the combined glass power, superabrasive grit, oxide component, and silicon carbide.

In an embodiment, the silicon carbide of superabrasive mixtures can be in the form of particles having a median particle size in a range of between about 0.1 microns and about 20 microns, and the silicon carbide can be present in the mixture in a range of between about 0.1 and about 5 volume percent of the total amount of glass powder, abrasive grit, binder, an oxide component, and silicon carbide components of the mixture.

In an embodiment, the oxide component can include an oxide of a lanthanoid, such as lanthanum, cerium, praseodymium, and neodymium. In a particular embodiment, the lanthanoid can include cerium, and can even consist essentially of cerium. The oxide component can have an average particle size of not greater than about 30 microns, such as not greater than about 25 microns, not greater than about 20 microns, not greater than about 18 microns, or even not greater than about 15 microns. In certain instances, the oxide component can have an average particle size within a range between about 0.1 µm and about 30 µm, such as within a range between about 0.1 microns and about 25 microns, between about 0.1 microns and about 20 microns, between about 0.1 microns and about 18 microns, or even between about 1 micron and about 15 microns.

The oxide component can be in an amount in a range of between about 0.1 and about 10 volume percent of the superabrasive mixture, such as between about 1.0 and about 5.0 volume percent.

The method of forming a vitrified superabrasive product can include forming a green body that includes a glass powder, a superabrasive grit, a binder, an oxide component, and silicon carbide. The superabrasive mixture can be formed by combining the components of the mixture in a suitable manner, such as is known in the art. In an embodiment, the glass powder, superabrasive grit, oxide component, and silicon carbide can be blended to form a substantially homogeneous blend. The blend can be screened, such as through a stainless steel mesh ranging from about 40 mesh to about 400 mesh. The binder can be added to the mixture blend and the mixture can until the binder is integrated into it. The mixture can be screened to obtain granules using a stainless screen mesh ranging in size from about 4 mesh to about 60 mesh. The granules can be dried for about 1 hour to about 3 days. After drying, granules can be screened using a screen sized from about 4 mesh to about 60 mesh.

In an embodiment, a green body (i.e. unsintered body) can be formed from the mixture, also by a suitable method, such as is known in the art. For example, the mixture can be placed in a mould and compressed using cold isostatic pressing with a pressure of between about 0.1 Ton/in$^2$ to about 10 Ton/in$^2$. The green body can be fired under an atmosphere and pressure, and at a temperature sufficient to form a porous vitrified superabrasive structure. For example, the green body can be fired in air at a temperature in a range of between about 600° C. and 820° C. for a period of time in a range of between about 0.1 hour and about 10 hours. Alternatively, an atmosphere including nitrogen or argon, or a vacuum can be used. The fired product can then be allowed to cool by a suitable method, such as by natural cooling of the furnace, to thereby form the superabrasive product.

Typically, the vitrified superabrasive product as configured can be at least a component of a grinding tool. An example of a suitable grinding tool is a wheel.

In one preferred embodiment, the vitrified superabrasive product is a fixed abrasive vertical spindle (FAVS) grinding wheel. An example of a FAVS grinding wheel, is shown in FIG. 1. Tool 10 is configured as a wheel having a base 12 about an axis 14. Raised perimeter 16 of wheel supports abrasive segment 18 about the perimeter of base 12. Abrasive segment 18 is one embodiment of a vitrified superabrasive product. Typically, the base 12 will have a diameter in a range of between about six inches and about twelve inches, the height (h) of the abrasive segment 18 will be in a range of between about 2 millimeters and about 20 millimeters and have a width (w) of between about 2 millimeters and about 10 millimeters. Wheels, as described with reference to FIG. 1, are suitable for wafer grinding by rotation about their axis. In a direction counterclockwise to a rotation of the axis of a wafer being ground by the tool.

A Surface Roughness Index can be determined by back grinding a series of silicon wafers. During back grinding, the superabrasive can be rotated at a speed of 5500 rpm while contacting the surface of the wafer with the chuck table rotating at a speed of 80 rpm. The wafer can be ground from a starting thickness of 450 microns to a final thickness of 430 microns. The feed rate of the superabrasive can be 0.80 microns/sec until the wafer thickness is reduced to about 434 microns. The feed rate can then be reduced to 0.50 microns/sec until the wafer thickness if about 430 microns. Upon reaching a thickness of about 430 microns, the feed rate can be reduced to 0.10 microns/sec until the final thickness of 430.0 is achieved.

The Ra (arithmetic average of the roughness profile) of the surface of the wafer can be determined at four points on the wafer including the center and three locations approximately 1 cm from the edge and approximately 120° apart. The Ra for each point can be determined optically at 40× magnification. The readings for each wafer can be averaged to determine the average Ra of each wafer. The average Ra of the wafers can be averaged to determine the Surface Roughness Index, a number that can be associated with a grinding tool of the embodiments herein.

EXAMPLES

Sample 1 is a high porosity vitrified diamond superabrasive structure made by firing a mixture of a superabrasive grain, a glass frit, a binder, and a silicon carbide powder. The composition of the mixture in volume percentage, before firing, was: 19% diamond, 80% glass frit, and 1% of SiC.

Sample 2 is a high porosity vitrified diamond superabrasive structure made by firing a mixture of a superabrasive grain, a glass frit, a binder, ceria, and a silicon carbide powder. The composition of the mixture in volume percentage, before firing, was: 19% diamond, 78% glass frit, 1% of SiC, and 2% ceria. Both Samples 1 and 2 are prepared as follows.

Polyethylene glycol in water (PEG) solution is used as binder and it was used in 15 mass percentage of the above mix. The polyethylene glycol is purchased from Union Carbide Corporation, USA. Diamond of grit size 1-2 micron is obtained from Diamond Innovation, Inc, OH, USA. The glass frit is composed of following oxides: $Al_2O_3$, $B_2O_3$, BaO, CaO, $Fe_2O_3$, $K_2O$, $Li_2O$, MgO, $Na_2O$, $SiO_2$, ZnO and $ZrO_2$. The SiC of 1200 grit is obtained from Saint-Gobain Ceramics & Plastics, Inc., Worcester, Mass. USA. The ceria particles having a size of 3-6 microns are obtained from Sigma Aldrich.

All the components of the mixture except PEG are weighed in a steel bowl to obtain the above-described superabrasive mixture. A steel spoon is used to blend all powder components of the mixture until a visually homogeneous mix was obtained.

The blend is then screened three times through a 165 mesh stainless steel mesh. Binder is added to the mixture in the amount specified above. The mixture is again spoon blended until all the binder was integrated into it. The mixture is screened once using a 20 mesh stainless screen mesh to obtain granules. These granules are spread on wax paper and left to dry for one day. After drying, granules are screened using a 16 mesh screen.

The theoretical density of the final mixture is calculated using information on their proportion in the mixture. This information is used to obtain the weight of the granules needed to make a disc 5" in diameter and 0.200" height. To make the green body for firing, dried granules are weighed and transferred into a stainless steel mould 5.00" in diameter and leveled using a small steel plate. The mould is transferred onto a cold isostatic press. A pressure of 1 Ton/in² is applied to yield a green body.

This green body is transferred into a furnace and following firing schedule is applied: 5° C./min ramp to 550° C. from room temperature, soak for 60 min at 550° C., 5° C./min ramp to 700° C., soak for 240 min at 700° C. and naturally cool down in the furnace. The furnace atmosphere is air.

Figure 2:
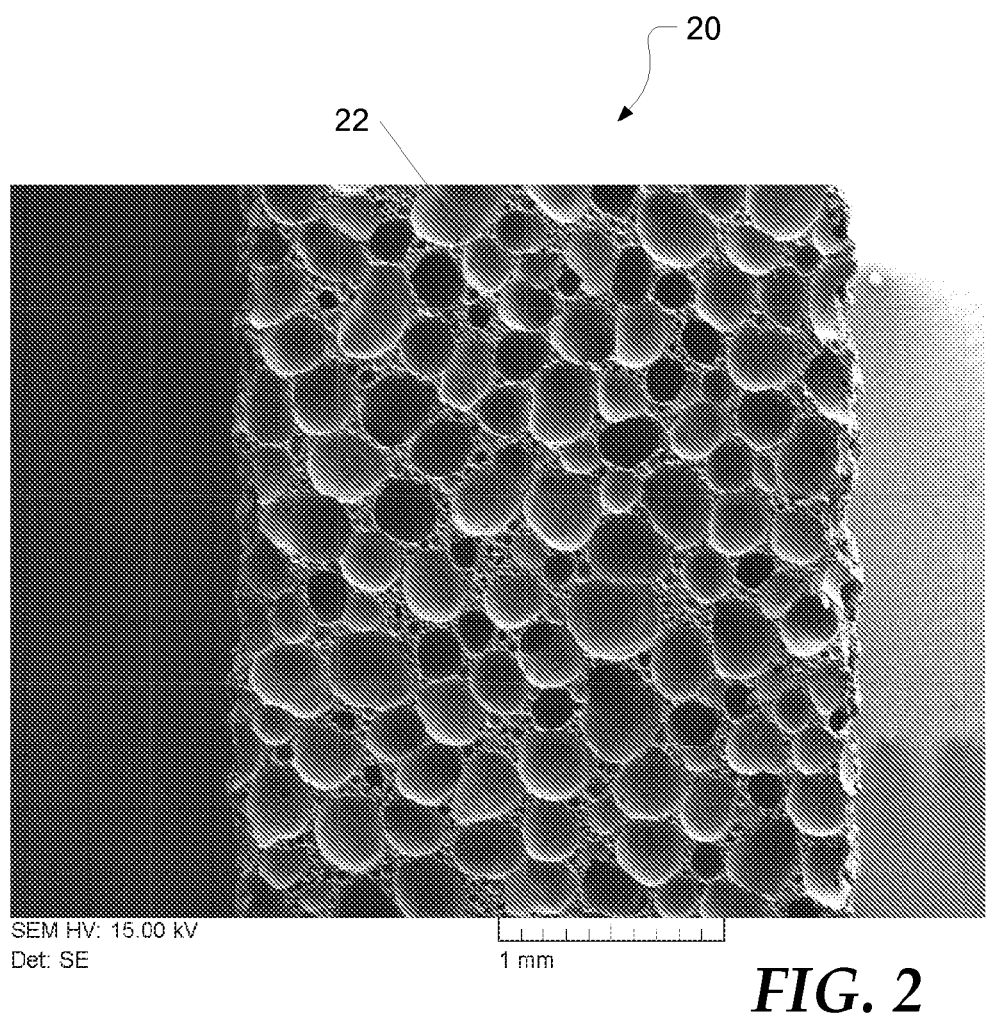
FIGS. 2 and 3 are scanning electron micrographs of an exemplary vitrified superabrasive product.

FIGS. 2 and 3 show scanning electron micrographs of the vitrified superabrasive product 20. As can be seen in FIG. 3, the superabrasive product includes large pores 22 separated by a large pore spacing distance 28 and bond bridges 26 extending between the large pores. The bond bridges 26 include small pores 24. The resulting superabrasive product has essentially no pores having a diameter greater than 500 μm. About 70% of the pores have a diameter in a range of between about 60 μm and 300 μm, and the average aspect ratio of the pores is less than about 1.2. Porosity of the superabrasive product is estimated to be in a range of between about 67% and 73%.

The fired body is dome-shaped. It is lapped into a disc shape to easily cut out segments for making a superabrasive wheel. A Speedfame double sided lap unit is employed for lapping with 280/400 grit SiC. The lapped plate is cut into segments using a waterjet cutting machine. These segments are mounted on a 5" wheel using glue to make a superabrasive wheel. A second wheel is then made to the same specification.

The wheels are tested on a backgrinding machine (Strasburg 7AF). The wheel is dressed using an extra-fine pad. The wheels are used to grind 8 inch silicon wafers. The silicon wafers are rough ground with a rough wheel followed by fine wheel which are the same specification mentioned above.

TABLE 1

| | Surface Roughness Index |
|---|---|
| Sample 1 | 40 |
| Sample 2 | 30 |

Note that not all of the activities described above in the general description or the Examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

The invention claimed is:

1. A grinding tool, comprising:
   a) a base; and
   b) a vitrified superabrasive component at a surface of the base, the vitrified superabrasive component including:
      i) a superabrasive component; and
      ii) a vitrified bond component in which the superabrasive component is dispersed, the vitrified bond component including an oxide of a lanthanoid comprising cerium oxide, wherein the vitrified bond component defines pores occupying greater than about fifty percent of the total volume of the vitrified superabrasive component, wherein the oxide of the lanthanoid is present in an amount in a range of between about 0.1 volume percent and about 10 volume percent of the vitrified superabrasive product.

2. The grinding tool of claim 1, wherein the oxide of the lanthanoid includes an element having an atomic number not less than 57 and not greater than 60.

3. The grinding tool of claim 1, wherein a volume ratio of the superabrasive component to the vitrified bond component is in a range of between about 3:2 and about 1:99.

4. The grinding tool of claim 1, wherein the superabrasive component is present in an amount in a range of between about 0.1 and about 20 volume percent of the vitrified superabrasive component.

5. The grinding tool of claim 1, wherein a median particle size of the superabrasive component is in a range of between about 0.1 microns and about 60 microns.

6. The grinding tool of claim 1, wherein the vitrified bond component includes at least one member selected from the group consisting of silicon dioxide ($SiO_2$), boron oxide ($B_2O_3$), aluminum oxide ($Al_2O_3$), alkali oxides ($Li_2O$, $Na_2O$, $K_2O$) and alkaline earth oxides (CaO, MgO, BaO).

7. The vitrified superabrasive product of claim 1, wherein:
   the vitrified bond component defines pores that are all less than 800 μm in diameter, seventy percent of which are in a range of between about 40 μm and about 500 μm, and have an average aspect ratio less than about 2, and
   wherein the vitrified superabrasive product has a Surface Roughness Index of not greater than about 35 Angstroms.

8. The vitrified superabrasive product of claim 7, wherein a majority of the pores are large pores having a average pore size of at least about 100 μm.

9. The vitrified superabrasive product of claim 8, wherein a large pore spacing distance between immediately adjacent large pores is not greater than a radial distance ($D_R$), wherein the radial distance ($D_R$) is defined as a measure of the average radius of the large pores.

10. The vitrified superabrasive product of claim 9, wherein the large pore spacing is not greater than about $0.5(D_R)$.

11. The vitrified superabrasive product of claim 8, wherein a majority of the large pores are abutting each other.

12. The vitrified superabrasive product of claim 11, wherein at least about 75% of the large pores are abutting each other.

13. The vitrified superabrasive product of claim 8, wherein bond bridges comprising the vitrified bond material extend between the large pores.

14. The vitrified superabrasive product of claim 13, wherein the bond bridges comprise small pores having an aspect ratio of less than about 2.

15. The vitrified superabrasive product of claim 14, wherein the small pores have a average pore size of less than about 100 μm.

16. The vitrified superabrasive product of claim 7, wherein the vitrified bond component has a porosity in a range of between about 50% and about 90% of the total volume of the vitrified superabrasive product.

17. A method of forming a vitrified superabrasive product, comprising:
   a) forming a green body that includes a glass powder, a superabrasive grit, a binder, silicon carbide, and an oxide of a lanthanoid comprising cerium oxide, wherein the oxide of the lanthanoid comprises an average particle size within a range between about 0.1 microns and about 30 microns; and
   b) firing the green body under an atmosphere and pressure, and at a temperature, sufficient to form a porous vitrified superabrasive product.

18. The method of claim 17, wherein the binder includes at least one member selected from the group consisting of polyethylene glycol, water, a mixture of polyethylene glycol and water and colloidal silica.

* * * * *